United States Patent [19]

Murray et al.

[11] 4,145,372

[45] Mar. 20, 1979

[54] PROCESS FOR PREPARING MOLDABLE POLYAMIDE POLYESTER COMPOSITIONS

[75] Inventors: Christopher L. Murray, Warley; Corwyn P. Vale, Brierley Hill, both of England

[73] Assignee: British Industrial Plastics, Ltd., Manchester, United Kingdom

[21] Appl. No.: 808,041

[22] Filed: Jun. 20, 1977

[30] Foreign Application Priority Data

Jun. 23, 1976 [GB] United Kingdom ............... 26105/76

[51] Int. Cl.² .............................................. C08L 77/00
[52] U.S. Cl. ...................... 260/857 PE; 260/857 UN
[58] Field of Search .................. 260/857 PE, 857 UN

[56] References Cited

U.S. PATENT DOCUMENTS

| | | | |
|---|---|---|---|
| 3,274,289 | 9/1966 | Murdock | 260/857 UN |
| 3,288,759 | 11/1966 | Holub | 260/857 PE |
| 3,468,975 | 9/1969 | Duxbury | 260/857 PE |
| 3,484,339 | 12/1969 | Caldwell | 260/857 PE |
| 3,810,876 | 5/1974 | Cowell | 260/857 PE |
| 4,014,829 | 3/1977 | Baird | 260/857 UN |

*Primary Examiner*—Paul Lieberman
*Attorney, Agent, or Firm*—Stevens, Davis, Miller & Mosher

[57] ABSTRACT

A polyester/nylon co-condensate which may be made from the two polymers in an extruder. The co-condensate comprises from 50 to 99% by weight of polyamide having a softening point of from 210° C. to 270° C. and a number average molecular weight in the range 10,000 to 30,000 and from 50% to 1% by weight of a polyester which is selected from saturated and unsaturated polyesters and which has an acid value of from 30 to 90 and a number average molecular weight less than 10,000. The co-condensate can also contain an acrylic homo- or co-polymer as a third component.

13 Claims, No Drawings

PROCESS FOR PREPARING MOLDABLE POLYAMIDE POLYESTER COMPOSITIONS

This invention concerns improvements in or relating to co-condensates of a polyester and a polyamide. According to the present invention, a polyester/nylon co-condensate comprises:

(i) from 50 to 99% by weight of polyamide having a softening point of from 210° to 270° C., and a number average molecular weight in the range 10,000 to 30,000, and (ii) from 50 to 1% by weight of a polyester which is selected from saturated and unsaturated polyesters and which has an acid value of from 30 to 90 and a number average molecular weight less than 10,000.

If a polyethylene- or polybutylene terephthalate is used it is preferably one which has been subjected to condensation with a third component, as exemplified in (b) below.

The polyester preferably has a number average molecular weight less than 5000 and preferably is one produced by:

(a) Condensing at least one aromatic or aliphatic dibasic acid or anhydride with at least one aliphatic di- or poly-hydroxy compound, or by condensing an aromatic dibasic acid or anhydride and at least one aliphatic dibasic acid or anhydride with at least one aliphatic di- or poly-hydroxy compound, at a temperature of from 175° to 245° C. to produce a hydroxy-terminated polyester intermediate, with an acid value of not more than 20, preferably 2 to 10 and (b) reacting the hydroxy-terminated polyester intermediate with a carboxylic acid or anhydride having an acid functionality of at least three in sufficient quantity to provide the resultant polyester with an acid value of from 30 to 90, more preferably from 50 to 75, and with a softening point of at least 100°, preferably 100° C. to 120° C.

The amount of polyester in the co-condensate is preferably from 1 to 25%, more preferably from 5 to 20%, by weight of the co-condensate.

The polyamide used in this invention may be prepared from polymerizable monoamino monocarboxylic acids of their amide-forming derivatives or from suitable diamine and suitable dicarboxylic acids or from amide forming derivatives of these compounds.

Preferably the polyamide is one containing the repeating unit

Where Z represents the carbonamide linkage —CO—NH—and R and R represent divalent aliphatic or cycloaliphatic groups. Polyhexamethylene adipamide and polycaprolactam (i.e. nylon 66 and nylon 6) are preferred examples.

The present invention also provides a moulding material comprising the polyester/nylon co-condensate aforesaid, having a filler uniformly dispersed therein. The filler content is preferably from 5 to 40% by weight of the moulding material, and the filler may comprise glass fibres, $CaCO_3$ or other particulate or fibrous inorganic or mineral filler material, or a mixture thereof. Flame retardant agents such as antimony oxide and halogenated hydrocarbon, or mixtures thereof, may also be incorporated.

The polyester and polyamide are preferably condensed together in an extruder at a temperature of 170° C. to 290° C., by feeding the extruder with a mixture thereof in particulate form. The extruder is preferably vented to remove the water of condensation which is produced by reaction between amine groups on the polyamide and acid groups of the polyester.

The co-condensate issuing from the extruder may be granulated to form a moulding material. A filler or mixture of fillers may be incorporated into the co-condensate either by blending with the polyester and polyamide mixture fed to the extruder or in the form of a 'masterbatch' in the polyamide before being fed to the extruder or injection machine.

The co-condensate may also comprise an acrylic homo- or co-polymer preferably in an amount of from 1 to 10% by weight of the total.

The acrylic polymer may, for example, be a multiphase acrylic polymer consisting of an elastomeric core with a glass transition temperature, Tg, less than 25° C., and a rigid thermoplastic shell, with a glass transition temperature, Tg, greater than 50° C. and containing amine reactive carboxylic acid groups. Acrylic polymers of this kind are described for reaction with polyamide in UK Pat. No. 1,368,628 and are prepared by sequential emulsion polymerization.

Alternatively the acrylic polymer may be a single phase rigid thermoplastic polymer, similar to the shell of the previously described acrylic polymers, and containing a polymerizable carboxylic acid. Such polymers may be prepared by solution polymerization with a free radical initiator of, for example, a polymerizable carboxylic acid, eg acrylic acid; an alkyl acrylate, eg butyl acrylate; and another acrylic monomer, eg methyl methacrylate.

Such co-condensates may suitably be prepared by blending the polyester-polyamide co-condensate with an acrylic-polyamide copolymer. Alternatively the acrylic-polyamide co-polymer may be made in situ in which case the polyester, polyamide and acrylic polymers are blended and all fed simultaneously to a vented extruder.

The following examples are given to illustrate preferred embodiments of the invention, parts and percentages being by weight unless otherwise stated.

EXAMPLE A 789 parts of isophthalic acid were condensed with 313 parts of ethylene glycol at a temperature of about 205°–215° C. to produce a hydroxy-terminated polyester intermediate having an acid value of 5, and this intermediate was reacted with 96 parts of trimellitic anhydride to yield a polyester having an acid value of 64.7 a softening point of from 105°–115° C., and a calculated number average molecular weight of approximately 3500.

EXAMPLES 1 to 4

The polyester of Example A was co-condensed with BEETLE nylon Grade MD3 (number average molecular weight 15,000) by introducing a mixture of the two polymers into a vented Welding Engineers extrusion machine (BEETLE is a Registered Trade Mark of British Industrial Plastics Limited). Temperatures of the heating zones between the hopper and extruder nozzle were as follows: 170° C. (hopper), 215° C.; 225° C.; 240° C.; 250° C., 240° C. (nozzle). The extrudate, after cooling and chopping, was moulded in a BIPEL type 70/31 injection machine operating with a barrel temperature of 230°–250° C. (BIPEL is a Registered Trade Mark of British Industrial Plastics Limited). The mouldings were tested for water absorption by immersion in water at 22°–24° C. for 24 hours. Table 1 shows the proportions of nylon and polyester used and the percentage increase in weight due to water absorbed.

TABLE 1

| Composition and | EXAMPLES | | | | |
|---|---|---|---|---|---|
| Test | 1 | 2 | 3 | 4 | 5 |
| Nylon | 98 | 95 | 90 | 85 | 100 |
| Polyester | 2 | 5 | 10 | 15 | 0 |
| Water Absorption % | 1.52 | 1.44 | 1.22 | 1.07 | 1.83 |

EXAMPLE 5 (Comparative)

Mouldings similar to those produced in Examples 1 to 4 were produced from the nylon 6 only. The result of testing this material is shown in the Table 1.

EXAMPLE 6 to 8

Polyester/nylon co-condensates were made and tested by the method described for Examples 1 to 5, with the inclusion of an acrylic polymer, Paraloid KR725 additive, available from Rohm & Haas all three polymers being introduced to the extruder as a mixture. The temperatures of the heating zones between the hopper and the extruder nozzle were in the range 190° C. to 280° C. The compositions and results are shown in Table 2, example 8 being included for comparison purposes.

TABLE 2

| Composition and | EXAMPLES | | |
|---|---|---|---|
| Test | 6 | 7 | 8 |
| Nylon | 84 | 76.5 | 90 |
| Polyester | 15 | 13.5 | 0 |
| Paraloid KR725 | 1 | 10 | 10 |
| Water absorption, % | 1.21 | 1.16 | 1.64 |

The results indicate that considerable improvement in water absorption can be achieved (i.e. less water is absorbed) by forming mouldings from the co-condensates of the invention.

The polyester co-condensates are also cheaper, weight for weight, than the nylon or acrylic-modified nylon polymers alone.

EXAMPLES 9 to 16

These examples illustrate the use of various different polyesters in co-condensates with nylon 6, Example 16 being included to show the physical properties of the nylon 6 used.

In each of examples 9 to 15 the polyester was made by the technique used in Example A, i.e. a hydroxy-terminated polyester intermediate was made by reacting the glycol(s) with the acid(s) and the intermediate further reacted with trimellitic anhydride. All these polyesters had calculated number average molecular weights below 10,000.

Co-condensates were made from each polyester by the method described in Examples 1 to 4, using 10% of polyester (by weight) with nylon 6 polymer. The temperatures of the heating zones between the hopper and the extruder nozzle were in the range 170° C. to 250° C.

Test Mouldings were made from the co-condensates as in Examples 1 to 4 the unmodified nylon 6 also being moulded and tested for comparison.

The formulations of the various polyesters used and the physical properties of the co-condensates with nylon 6 made therefrom are given below in Tables 3 and 4 below.

TABLE 3

| Example No. | 9 | 10 | 11 | 12 | 13 | 14 | 15 |
|---|---|---|---|---|---|---|---|
| Polyester formulation (moles) | | | | | | | |
| Ethylene Glycol | 1.10 | 0.56 | — | 0.56 | 0.504 | 0.504 | 0.56 |
| Propylene Glycol | — | 0.56 | 1.12 | 0.56 | 0.504 | 0.504 | 0.56 |
| Cardura "E" | — | — | — | — | 0.112 | — | — |
| Neo pentyl Glycol | — | — | — | — | — | 0.112 | — |
| Isophthalic acid | 1.00 | 1.00 | 1.00 | 1.90 | 1.00 | 1.00 | 0.90 |
| Sebacic acid | — | — | — | 0.10 | — | — | — |
| Dimethyl terephthate | — | — | — | — | — | — | 0.10 |
| Trimellitic anhydride | 0.16 | 0.16 | 0.16 | 0.16 | 0.16 | 0.16 | 0.16 |

TABLe 4

| Example No. | 9 | 10 | 11 | 12 | 13 | 14 | 15 | 16 |
|---|---|---|---|---|---|---|---|---|
| % Polyester by wt based on total co-condensate | 10 | 10 | 10 | 10 | 10 | 10 | 10 | 0 |
| Tensile Strength (MPa) | 76 | 79 | 74 | 79 | 70 | 71 | 73 | 67 |
| Tensile Modulus (GPa) | 3.2 | 3.3 | 3.2 | 3.6 | 3.3 | 3.4 | 3.3 | 2.9 |
| % Elongation (Yield) | 4.4 | 4.3 | 4.6 | 4.4 | 4.3 | 4.3 | 4.1 | 4.4 |
| Flexural Strength (MPA) | 115 | 115 | 90 | 107 | 115 | 116 | 115 | 88 |
| Flexural Modulus (GPa) | 3.0 | 3.0 | 2.9 | 2.9 | 3.0 | 3.0 | 3.0 | 2.8 |
| Notched Impact Strength (KJ/m$^3$) | 2.3 | 1.8 | 3.56 | 2.7 | 2.0 | 2.3 | 2.3 | 4.0 |
| Water absorption % (Initial Dry wt.) | 1.28 | 1.27 | 1.71 | 1.30 | 1.34 | 1.28 | 1.34 | 2.18 |
| Water absorption % (Final Dry wt.) | 0.98 | 0.95 | 1.22 | 0.98 | 1.02 | 0.97 | 1.01 | 1.49 |

EXAMPLES 17 to 23

These Examples illustrate the effect of increasing the amount of polyester in a nylon6/polyester co-condensate in which the polyester was was made as described in Example A from Propylene Glycol (1.12 moles), Isophthalic acid (1.00 mole) and trimellitic anhydride (0.16 mole). Co-condensates with nylon 6 were made using differing proportions of the polyester by the method described in Examples 1 to 4 the temperatures of the heating zones between the hopper and the extruder nozzle being in the range 190° C. to 255° C. for Examples 17 to 20 inclusive and in the range 125° C. to 250° C. for Examples 21 to 23 inclusive, the temperatures of the feed zones being lowered in the latter examples owing to the higher proportions of polyester.

Test mouldings were made from each co-condensate as in Example 1 to 4 and tested the results being given in Table 5 below.

TABLE 5

| Example No. | 17 | 18 | 19 | 20 | 21 | 22 | 23 |
|---|---|---|---|---|---|---|---|
| % Polyester (by wt. based on total co-condensate) | 2 | 5 | 10 | 15 | 20 | 25 | 30 |
| Tensile Strength (MPa) | 76 | 76 | 76 | 67 | 51 | 30 | 34 |
| Tensile Modulus (GPa) | 3.2 | 3.2 | 3.2 | 3.4 | 3.5 | 3.4 | 3.3 |
| % Elongation* | 4.8Y | 4.7Y | 4.6Y | 3.6B | 2.3B | 1.2B | 1.9B |
| Flexural Strength (MPa) | 101 | 101 | 90 | 92 | 96 | 73 | 64 |
| Flexural Modulus (GPa) | 3.2 | 3.2 | 2.9 | 3.1 | 3.4 | 3.2 | 3.1 |
| Notched Impact Strength KJ/m$^2$ | 4.7 | 3.5 | 3.6 | 2.4 | 1.2 | 0.9 | 0.8 |
| Water Adsorption % (Initial Dry wt.) | 1.93 | 1.78 | 1.24 | 1.50 | 1.09 | 0.89 | 0.94 |
| Water Absorption % Final Dry wt.) | 1.42 | 1.31 | 1.22 | 1.11 | 0.84 | 0.69 | 0.73 |

*Y = Yield
B = Break

Examples 9 to 23 show that the polyester-nylon co-condensates absorb less water than nylon alone. Some physical properties may be enhanced e.g. tensile strength, flexural strength, at polyester loadings up to 20% whilst others may be lowered e.g. impact strength. The water absorption, however, is steadily decreased with increasing polyester content as is cost. A co-condensate may therefore be chosen from a wide range to obtain a desired level of physical properties at the lowest cost.

We claim:

1. A process for the production of a moldable thermoplastic composition from a polyamide which contains free amine groups and is of softening point in the range 210° to 270° C. and of number average molecular weight in the range 10,000 to 30,000, comprising heating a mixture comprising from 50 to 99% by weight of said polyamide and from 50 to 1% by weight of a polyester which is of number average molecular weight less than 10,000 and of acid value in the range 30 to 90, said polyester being one produced by (a) condensing an aromatic or aliphatic dibasic acid or anhydride with a carboxylic aliphatic di- or poly-hydroxy compound, to produce a hydroxy-terminated polyester intermediate, and (b) reacting said hydroxy-terminated polyester intermediate with an acid which contains at least 3 carboxylic acid groups, or with an anhydride thereof, which is employed in a quantity such as to provide the polyester with an acid value in the range 30 to 90 and with a softening point of at least 100° C., heating of said mixture comprising polyamide and polyester being carried out at a temperature of at least 170° C. whereby water is produced by reaction between the polyamide and polyester and is allowed to escape from said mixture.

2. A process according to claim 1, wherein said anhydride of a carboxylic acid which contains at least 3 carboxylic acid groups is trimellitic anhydride.

3. A process according to claim 2, wherein said polyester is one produced from (i) a hydroxy-terminated polyester intermediate derived from ethylene or propylene glycol and isophthalic acid, and (ii) trimellitic anhydride.

4. A process according to claim 1, wherein said polyester of acid value in the range 30 to 90 has a number average molecular weight less than 5,000.

5. A process according to claim 4, wherein said polyester has an acid value in the range 50–75 and a softening point in the range 100°–120° C.

6. A process according to claim 1, wherein the polyamide is polyhexamethylene adipamide.

7. A process according to claim 1, wherein the polyamide is polycaprolactum.

8. A process according to claim 1, wherein the mixture which is heated at a temperature of at least 170° C. contains, in addition to polyamide and polyester, an acrylic homo- or copolymer in an amount in the range 1–10% by weight of the total polymeric material.

9. A process according to claim 8, in which the acrylic polymer is a multi-phase acrylic polymer consisting of an elastomeric core with a glass-transition temperature Tg greater than 50° C. and containing amine-reactive carboxylic acid groups.

10. A process according to claim 8 in which the acrylic polymer is a single phase rigid thermoplastic polymer having a glass transition temperature Tg greater than 50° C. and containing a polymerizable carboxylic acid.

11. A process according to claim 1, wherein the amount of polyester present in said mixture with polyamide is in the range 1–25% by weight.

12. A process according to claim 1, wherein the amount of polyester present in said mixture with polyamide is in the range 5–20% by weight.

13. A process according to claim 1, wherein the mixture comprising said polyamide and polyester is fed in particulate form to an extruder and heated therein at a temperature of at least 170° C.